United States Patent [19]

Dexter et al.

[11] Patent Number: 5,364,819
[45] Date of Patent: Nov. 15, 1994

[54] ULTRAVIOLET FARADAY ROTATOR GLASS

[75] Inventors: James L. Dexter, Alexandria, Va.; David G. Cooper, Riva, Md.; Douglas H. Blackburn, Damascus, Md.; David C. Cranmer, Olney, Md.; Dale A. Kauffman, Frederick, Md.

[73] Assignee: The United States of America as represented by the Secretary of the Navy, Washington, D.C.

[21] Appl. No.: 53,287

[22] Filed: Apr. 28, 1993

[51] Int. Cl.$^5$ ................................ C03C 3/32
[52] U.S. Cl. ........................ 501/45; 501/43; 501/44; 501/900; 501/905; 501/48; 252/301.4 P; 252/301.4 H
[58] Field of Search .............. 501/40, 43, 44, 45, 501/48, 900, 905; 252/301.4 P, 301.4 H

[56] References Cited

U.S. PATENT DOCUMENTS

| | | | |
|---|---|---|---|
| 3,711,264 | 1/1973 | Robinson et al. | 401/900 |
| 3,745,032 | 7/1973 | Miller et al. | 106/47 R |
| 3,935,020 | 1/1976 | Deeg et al. | 106/54 |
| 3,979,322 | 7/1976 | Alexeev et al. | 501/44 |
| 4,022,707 | 5/1977 | Deutschbein et al. | 252/301.4 P |
| 4,142,986 | 3/1979 | Rapp | 501/44 |
| 4,929,387 | 5/1990 | Hayden et al. | 252/301.4 P |
| 4,999,321 | 3/1991 | Kohli et al. | 501/42 |

OTHER PUBLICATIONS

J. L. Dexter et al., Ultraviolet Optical Isolators Utilizing KDP-Isomorphs, vol. 80 No. 2, Optics Communications, pp. 115–118 (15 Dec. 1990).
M. J. Weber, Faraday Rotator Materials, (Lawrence Livermore Laboratory, Livermore, Calif.) pp. 5,23–26, 29–32, 39–42, 83–86, 103–106, 139–142, 159–166 (1982), Jun.
Berger et al., Faraday Rotation of Rare-Earth(III) Phosphate Glasses, vol. 133 No. 3A, Physical Review, pp. A723–A727 (1964). No month.

*Primary Examiner*—Karl Group
*Assistant Examiner*—C. Bonner
*Attorney, Agent, or Firm*—Thomas E. McDonnell; Barry A. Edelberg

[57] ABSTRACT

A Faraday rotator glass composition based on a fluoride glass, phosphate glass, fluorophosphate glass or a mixture thereof is doped with a lanthanide in a concentration sufficient to provide a Verdet constant above at least 2870 deg/Tesla-meter [(1 min/cm-Oe)×(1.667×10$^4$)=1 deg/Tesla-meter] and optical transmission above at least 50 percent in a 25 mm thick polished glass sample at least at one wavelength in the 200 to 400 nm wavelength region. The Faraday rotator glass also includes monovalent non-lanthanide cations such as Na, Li, K or mixtures thereof in a concentration sufficient to provide a Verdet constant above at least 2870 deg/Tesla-meter and optical transmission above at least 50 percent in a 25 mm thick polished glass sample at least at one wavelength in the 200 to 400 nm wavelength region. The Faraday rotator glass further includes a concentration of divalent or trivalent non-lanthanide cations such as Mg, Be, Ca, Al or mixtures thereof sufficient to provide surface flatness of at least 1/10 of the operating wavelength at 632.8 nm.

19 Claims, 1 Drawing Sheet

ULTRAVIOLET FARADAY ROTATOR GLASS

BACKGROUND OF THE INVENTION

1. Field of the Invention

The present invention generally relates to a Faraday rotator glass composition and more specifically to an ultraviolet (UV:200 to 400 nm) transparent Faraday rotator glass composition.

2. Description of the Related Art

Glass compositions which exhibit the Faraday rotator phenomenon are well known to those skilled in the art. Examples of such Faraday rotators are discussed in James L. Dexter et al., *Ultraviolet Optical Isolators Utilizing KDP-isomorphs*, Vol. 80, No. 2 OPTICS COMMUNICATIONS pp. 115–118 (Dec. 15, 1990), incorporated herein by reference.

Some optical materials are optically active wherein rotation of plane polarized light is observed for such light passing through such optical material. However, many glasses do not rotate plane polarized light unless the glass is placed in a magnetic field when the plane polarized light is passed through it. This rotation of plane polarized light passing through the glass is called the Faraday effect.

There are two important measurable characteristics of Faraday materials that determine their usefulness. These are the Verdet constant, V, and the optical transmission, OT, of a given material at a given wavelength, λ, of light. In general, the relationship between the Verdet constant (V) and the optical transmission (OT) is as follows:

$$V \cong k_1/k_2(\lambda)^2 \cong k/OT$$

where k, $k_1$, and $k_2$ are numeric constants, and λ is the wavelength of light at which the Verdet constant, V, and the optical transmission, OT, are determined. An optimal Faraday material would have a high V constant and a high OT at a desired wavelength, λ; however, materials that tend to have high V constants also tend to have high absorption in the UV range, or stated alternatively, a low OT. Conversely, materials in the UV range with high OT have low V constants.

Optical isolators using Faraday rotators have not been widely used in the ultraviolet (UV:200–400 nm) region because materials with desirable Faraday rotating characteristics, denoted by a high Verdet constants ($V \cong k_1/k_2 \lambda^2$) at a desired wavelength, λ, tend to have low transmission in the UV region of the absorption spectrum. Id. at 115. According to Dexter et al., " . . . [m]aterials with large Verdet constants tend to have large absorption in the ultraviolet, while materials with good UV transmission have relatively small Verdet constants." Id.

Several materials have been used as Faraday materials and the advantages and disadvantages of those materials are cited in the table below:

| MATERIAL | WAVELENGTH | ADVANTAGES | DISADVANTAGES |
| --- | --- | --- | --- |
| Water | 308 nm, 248 nm | | Impurities in the water; Low Verdet constant |
| Fused Silica | 253.7 nm, 248 nm | V = 1710 deg/T-m at 253.7 nm for suprasil; V = 1920 deg/T-m at 248 nm for fused silica | Impurities present drastically alter the Verdet constant values; Verdet constant very sensitive to small changes in composition |
| Potassium dihydrogen phosphates (KDP & KDP isomorphs) | 248 nm, 222 nm, 193 nm, 190–350 nm | Superior to water and fused silica | Can be used only down to 190 nm with high OT; Material is hygroscopic so requires dry cell which adds 4 unwanted surfaces; Materials are soft thus cannot be polished to high optical grade flatness and cannot use anti-reflection coatings |
| Ammonium dihydrogen arsenates (ADA); also Potassium dihydrogen arsenates (KDA & KDA isomorphs) | 308 nm, 190–350 nm | Superior to water and fused silica; V = 1526 deg/T-m at 351 nm for ADA; V = 2328 deg/T-m at 308 nm for ADA | Larger Verdet constant than the phosphates but have high OT only down to 260 nm; Material is hygroscopic so requires a dry cell adding 4 unwanted surfaces; Materials are soft thus cannot be polished to high optictal grade flatness and cannot use anti-reflection coatings |

As noted in the table above, of the Faraday materials which have been used at UV wavelengths, the KDP-isomorphs are superior to both fused silica and water. However, better materials are desired due to the limitations of the isomorphs resulting from the material softness and hygroscopic nature. A characteristic common to the KDP-isomorphs is the relative softness of the crystals, which prevents polishing of the optical surfaces to a high surface flatness. Typically, the best flatness which can be achieved across the surface of the KDP-isomorphs is one-tenth (1/10) of a wavelength at 632.8 nm. Surface figures of one-fortieth (1/40) of a wavelength, or better, at 632.8 nm are desired to produce acceptable surface figures at UV wavelengths. Poor surface figures contribute to excessive wavefront distortion and scattering losses, particularly in the UV region. Further, due to their softness, the crystals cannot be supplied with anti-reflection coatings. All of these problems limit the practicality of the KDP-isomorphs as UV Faraday rotator materials. Practical Faraday rotators at wavelengths shorter than 400 nm are needed for operating in optical isolators for uses with lasers operating in the UV wavelength region. There is a strong need for better UV Faraday rotating materials that are harder, less hygroscopic than the KDP-isomorphs, have higher V constants and have higher OT in the UV wavelength region.

SUMMARY OF THE INVENTION

It is therefore an object of the present invention to provide a Faraday rotator glass material with sufficient hardness such that it can be polished to an acceptable surface figure (at least 1/10 of a wavelength at 632.8 nm) at UV wavelengths so as to minimize excessive wavefront distortion and scattering losses, particularly in the UV region.

It is another object of the present invention to provide a Faraday rotator glass material with sufficient non-hygroscopic properties such that the need for a dry cell is avoided.

It is yet another object of the present invention to provide a Faraday rotating glass material which has a V constant above 2870 deg/Tesla-meter OT above at least 50 percent in a polished glass sample wavelength region.

These and other objects are accomplished by synthesizing a novel Faraday rotator glass selected from the group consisting of fluoride, phosphate, fluorophosphate and mixtures thereof doped with a lanthanide constituent selected from the group consisting of Ce, Pr, Tm and mixtures thereof in a concentration sufficient to provide a high Verdet constant and high optical transmission in the UV wavelength region, a monovalent non-lanthanide cation constituent selected from the group consisting of Na, Li, K and mixtures thereof, and a divalent or trivalent non-lanthanide cation constituent selected from the group consisting of Mg, Be, Ca, Al and mixtures thereof.

These and other objects and advantages of the invention may be readily ascertained by referring to the following detailed description and examples of the preferred embodiments.

BRIEF DESCRIPTION OF THE DRAWINGS

A more complete appreciation of the present invention and several of the accompanying advantages thereof will be readily obtained by references to the following detailed description when considered in conjunction with the accompanying drawings, wherein.

DETAILED DESCRIPTION OF THE INVENTION

Figure 1:
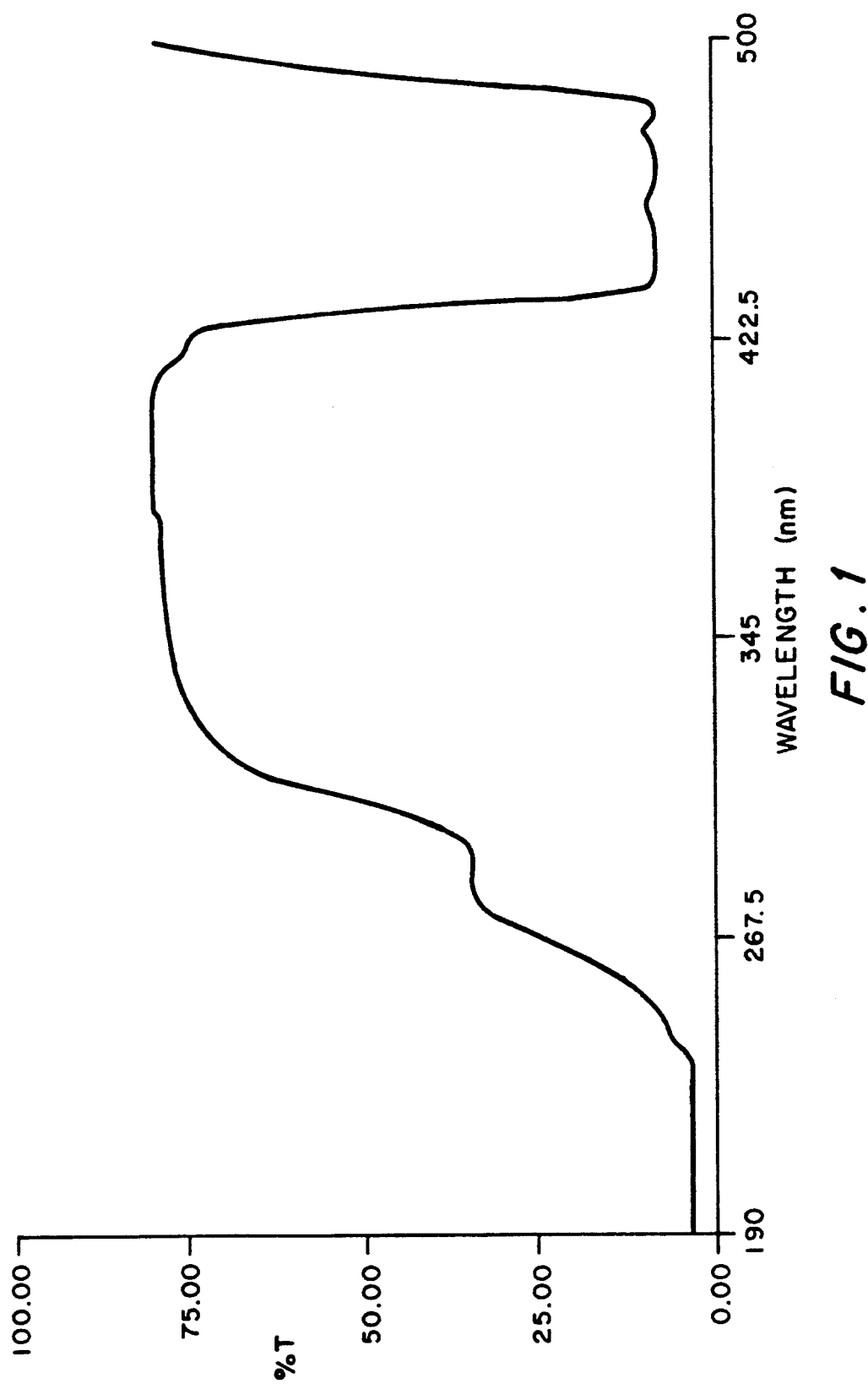
FIG. 1 is a plot of percent optical transmission (OT) versus wavelength for the glass prepared in example 1 containing 5 mole percent of $Pr_2O_3$.

The following detailed description of the preferred embodiment is provided to aid those skilled in the art in practicing the present invention. However, the following detailed description of the preferred embodiment should not be construed to unduly limit the present invention. Variations and modifications in the embodiments discussed may be made by those of ordinary skill in the art without departing from the scope of the present inventive discovery.

This invention relates to a novel Faraday rotator glass material with sufficiently large Verdet constant and optical transmission for use in the UV wavelength range. Typically, the novel Faraday rotator glass has the composition $A_u E_v E'_w G_x J_y$ wherein the Faraday rotator glass comprises "u" moles of one or more lanthanides selected from the group consisting of Ce, Pr, Tm, and mixtures thereof, denoted as constituent A; "v" moles of one or more monovalent non-lanthanide cations selected from the group consisting of Na, Li, K, and mixtures thereof, denoted as constituent E; "w" moles of one or more divalent or trivalent non-lanthanide cations selected from the group consisting of Mg, Be, Ca, Al, and mixtures thereof, denoted as constituent E'; "x" moles of the element O, denoted as constituent G; and "y" moles of one or more elements selected from the group consisting of P, F, and mixtures thereof, denoted as constituent J. The mole percentage of constituent A is determined by the formula:

Mole % $A = [u/(u+v+w+w+x+u)]100$

The mole percentages of the other constituents E, E', G and J are calculated in a likewise manner.

The lanthanide constituent A is the active Faraday rotating constituent and includes one or more dopants selected from the group consisting of praseodymium (Pr), cerium (Ce), and thulium (Tm). The amount of Faraday rotation, for a given magnetic field strength, varies linearly with the concentration of the lanthanide in the glass. See U.S. Pat. No. 3,711,264, column 1, lines 44–47; U.S. Pat. 3,935,020, column 1, lines 32–35. At zero percent constituent A, there will be negligible or no rotation. At above approximately 25 mole percent constituent A, the glass will begin to become unstable. Above approximately 25 mole percent constituent A, the glass begins to have striae within the glass caused by clumping of the lanthanide constituent resulting in a non-homogeneous glass mixture. The striae cause a marked increase in the scattering of light and therefore a marked decrease in the OT of the emerging light. With scattering of the emerging light and a low OT, a Verdet constant is difficult or impossible to measure. If a glass becomes unstable, it no longer has a uniform composition throughout the sample. This trait is highly undesirable in a glass that will be used with lasers. Thus the amount of Ce, Pr, Tm and mixtures thereof present in the glass must be sufficient to cause Faraday rotation of incident UV light when placed in a magnetic field; however, the amount of the lanthanide constituent A within the glass should be below a concentration at which the glass becomes unstable or non-homogeneous. The typical concentration of constituent A, the preferred concentration of constituent A, the more preferred concentration of constituent A, the most preferred concentration of constituent A within the novel Faraday rotator glass material are from about 0.0001 to about 25 mole percent, from about 0.5 to about 20 mole percent, from about 1.0 to about 15 mole percent and from about 1.5 to about 10 mole percent, respectively. For use in magnetic field detectors, the Faraday rotator glass may have a minimal amount of constituent A. For use of the glass in a Faraday optical isolator, the Faraday rotator glass, preferably, includes at least approximately 0.01 mole percent of constituent A.

The constituent E includes one or more elements selected from the group consisting of Na, Li and K. Constituent E improves the UV transmission properties of the novel Faraday rotator glass material. The presence of Na, Li, K, or mixtures thereof within the novel Faraday rotator glass increases the OT of the glass by 1 to 20 percent in the UV wavelength region. When used in laser applications, where a laser beam may pass through a Faraday rotator glass from 1 to 1000 times, a 20 percent increase in OT becomes significant. If the amount of constituent E is increased above approximately 50 mole percent, the glass will become water soluble. As a result of this water solubility, the surfaces of the glass become fogged when they come into contact with the humidity in the room air. To control the hygroscopicity of the glass, constituent E is limited to a maximum concentration of about 50 mole percent. The typical concentration of constituent E, the preferred concentration of constituent E, the more preferred concentration of constituent E, and the most preferred concentration of constituent E, are from about 0.01 to about 50 mole percent, from about 1 to about 25 mole percent, from about 2 to about 30 mole percent and from about 3 to about 25 mole percent, respectively.

The constituent E' includes one or more elements selected from the group consisting of Mg, Be, Ca and Al. Constituent E' improves the strength of of the glass. As the concentration of constituent E' is increased, the strength and the hardness of the glass increases. For example, applications in lithography require a Faraday rotator glass of sufficient strength and hardness to allow one to achieve surface quality (flatness) from about 1/20 to about 1/30 of the operating wavelength, such as in a He:Ne laser operating at 632.8 nm. A sufficient amount of constituent E' is added to increa the hardness of the Faraday rotator glass to achieve surface quality (flatness) of at least 1/10 of a wavelength at 632.8 nm. However, above approximately 50 mole percent of constituent E', the glass begins to become unstable. The inclusion of, for example, magnesium and sodium ions into phosphate, fluoride, or fluorophosphate glasses increases the optical transmission, in the 200 to 400 nm wavelength region, above that of other glasses into which Pr has been doped. See M. J. Weber's "Faraday Rotator Materials" (Lawrence Livermore Laboratory, Livermore, Calif., 1982). The typical concentration of constituent E', the preferred concentration of constituent E', the more preferred concentration of constituent E', and the most preferred concentration of constituent E', are from about 0.01 to about 50 mole percent, from about 1 to about 40 mole percent, from about 2 to about 30 mole percent and from about 3 to about 25 mole percent, respectively. Typically, the total non-lanthanide monovalent, divalent, and/or trivalent cation concentration is less than 65 mole percent.

The constituents A, E, E', and J are generally added to the novel Faraday rotator glass mixture in the form of their respective oxides or phosphates. Oxygen may be added to form the novel Faraday rotator glass by introducing the constituent A in the form of an oxide selected from the group consisting of Ce, Pr, Tm and mixture thereof. Constituent E of the novel Faraday rotator glass material is added as an oxide selected from the group consisting of oxides of Na, oxides of Li, oxides of K and mixtures thereof or a phosphate selected from the group consisting of phosphates of Na, phosphates of Li, phosphates of K and mixtures thereof. For example, if an oxide of sodium (Na) is used, then the oxide is $Na_2O$. For example, if the phosphate of sodium (Na) is used, then the phosphate is $NaPO_3$. Constituent E' of the novel Faraday rotator glass material is added in the form of an oxide selected from the group consisting of oxides Mg, oxides of Be, oxides of Ca, oxides of Al and mixtures thereof or a phosphate selected from the group consisting of phosphates of Mg, phosphates of Be, phosphates of Ca, phosphate Al and mixtures thereof. For example, if an oxide of magnesium (Mg) is used, then the oxide is MgO. For example, if the phosphate of magnesium (Mg) is used, then the phosphate is $Mg(PO_3)_2$.

Constituent J of the novel Faraday rotator glass includes an element selected from the group consisting of P, F and mixtures thereof. If phosphorous is used, it is introduced into the glass in an amount sufficient to improve the UV transmission properties of the glass. To form the glass, phosphorous is added as a phosphate ($PO_3$), such as $NaPO_3$, $LiPO_3$, $KPO_3$, or mixtures thereof, or $P_2O_5$ (added as $NH_4.H_2PO_4$). If fluoride is used instead, it is introduced into the glass in the form of $BeF_2$, $AlF_3$, $CaF_2$, $MgF_2$, LiF, NaF, KF or mixtures thereof.

A combination of the oxides, fluorides and phosphates of the monovalent, divalent or trivalent non-lanthanide cations selected from the group consisting of the oxides of Na, the oxides of Li, the oxides of K, the oxides of Be, the oxides of Mg, the oxides of Ca, the oxides of Al, the fluorides of Na, the fluorides of Li, the fluorides of K, the fluorides of Be, the fluorides of Mg, the fluorides of Ca, the fluorides of Al, the phosphates of Na, the phosphates of Li, the phosphates of K, the phosphates of Be, the phosphates of Mg, the phosphates of Ca, the phosphates of Al and mixtures thereof may be used. In addition, the combination of the oxides, fluorides and phosphates of the lanthanide cations selected from the group consisting of the oxides of Ce, the oxides of Pr, the oxides of Tm, the fluorides of Ce, the fluorides of Pr, the fluorides of Tm, the phosphates of Ce, the phosphates of Pr, the phosphates of Tm and mixtures thereof may be used where appropriate. For example, in a fluorophosphate glass, the respective phosphates of the lanthanide and non-lanthanide cations and the respective fluorides of the lanthanide and non-lanthanide cations selected from the groups listed above may be used in combination.

The result of using the oxides of the constituents A, E, E', and J is that oxygen (O) becomes an integral constituent of the novel Faraday rotator glass and denoted by constituent G. The typical concentration of constituent G, the preferred concentration of constituent G, the more preferred concentration of constituent G, and the most preferred concentration of constituent G, are from about 10 to about 90 mole percent, from about 25 to about 85 mole percent, from about 30 to about 80 mole percent and from about 35 to about 75 mole percent, respectively.

After accounting for constituents A, E, E' and G, the remainder of the glass consists essentially of constituent J. Minute amounts of impurities or other elements that do not detract significantly from the value of the Verdet constant, the optical transmission, the hardness and strength, and the lack of hygroscopicity of the glass may be present.

The fluoride, phosphate or fluorophosphate glasses of the present invention may be made by any technique typically used to make fluoride, phosphate or fluorophosphate based glasses. One exemplary procedure for making fluoride, phosphate or fluorophosphate based glasses is outlined below and is, of course, satisfactory for making the glasses of the present invention:

1) mixing the powders of the respective oxides, fluorides, phosphates or mixtures thereof of constituents A, E, E' and J where available (the raw materials) for 1-2 hours,
2) placing the mixed powders in a ceramic (alumina) crucible,
3) heating to 300° C. for 16 hours, to convert $NH_4.H_2PO_4$ to $P_2O_5$ if $NH_4.H_2PO_4$ is used,
4) placing the heated mixture in a furnace preheated to 860° C.,
5) raising the temperature to 1220°-1250° C. at 300°-400° C./hour,
6) pouring the molten glass into an aluminum mold and letting it cool into a solid,
7) remelting the solidified glass at 1100° C. in a platinum crucible,
8) cooling the remelting glass at ambient room temperature,
9) annealing the solidified glass between 500°-540° C., and
10) repeating steps 7 to 10 to remove seeds and bubbles as necessary. In step 6, the cooling rate is not critical; however, any cooling rates suitable for cooling fluoride, phosphate or fluorophosphate glasses may be used. In step 6, the sample may be cooled at ambient room temperature to form a solid. In other words, the cooling rate in the ambient room temperature is a cooling rate sufficient for the molten glass to solidify.

After solidification, the glass may contain many seeds and bubbles which must be eliminated in the final product. Removal of any seeds and bubbles may be accomplished by remelting and annealing the glass in a platinum crucible as outlined in steps 7 to 10. These remelting and annealing steps from step 7 to 10 are repeated at least two times. Steps 7 to 10 (including steps 7 and 10) may be repeated as often as is necessary to remove any seeds and/or bubbles present in the Faraday rotator glass to be formed. Remelting may be done at any suitable temperature, preferably, 1100° C., repouring into an aluminum mold at any suitable temperature, preferably, 1030°-1040° C., and annealing at any suitable temperature, preferably, between 500°-540° C. After sufficient remelting and annealing, the glass is ready for fabrication to the precise dimensions needed to fit the optical device.

The following examples outline two preferred embodiments of the present invention.

EXAMPLE 1

The Faraday material is a glass comprising praseodymium oxide ($Pr_2O_3$), magnesium oxide (MgO), phosphorous pentoxide ($P_2O_5$), and sodium metaphosphate ($NaPO_3$). The glass is made from a melt of $Pr_2O_3$, MgO, $NH_4.H_2PO_4$, and $NaPO_3$. One composition shown to work consists of:

| | | |
|---|---|---|
| 14.5% by weight $Pr_2O_3$ = | 5.0 mole % $Pr_2O_3$ = | 2.0 mole % Pr |
| 8.8% by weight MgO = | 25.0 mole % MgO = | 5.0 mole % Mg |
| 49.8% by weight $P_2O_5$ = | 40.0 mole % $P_2O_5$ = | 15.8 mole % P |
| 26.9% by weight $NaPO_3$ = | 30.0 mole % $NaPO_3$ = | 5.9 mole % Na = 6.0 mole % P and = 65.3 mole % O. |

This composition was made by the following procedure:

1) mixing the powders of the respective oxides and phosphates (the raw materials) to achieve the mole percentages listed above for 1-2 hours,
2) placing the mixed powders in a ceramic (alumina) crucible,
3) heating to 300° C. for 16 hours, to convert $NH_4.H_2PO_4$ to $P_2O_5$,
4) placing the heated mixture in a furnace preheated to 860° C.,
5) raising the temperature to 1220°-1250° C. at 300°-400° C./hour,
6) pouring the molten glass into an aluminum mold and letting it cool into a solid,
7) remelting the solidified glass at 1100° C. in a platinum crucible,
8) cooling the remelted glass at ambient room temperature,
9) annealing the solidified glass between 500°-540° C., and
10) repeating steps 7 to 10 to remove seeds and bubbles as necessary.

In step 6, the sample was cooled at ambient room temperature to form a solid. After solidification, the glass contained many seeds and bubbles which required elimination in the final product. Removal of the seeds and bubbles was accomplished by remelting and annealing the glass in a platinum crucible as outlined in steps 7 to 10. This remelting and annealing step was repeated two times. Remelting was done at 1100° C., repouring into an aluminum mold at 1030°-1040° C., and annealing between 500°-540° C. Following the second remelting and annealing, the glass was ready for fabrication to the precise dimensions needed to fit the optical device.

EXAMPLE 2

Another Faraday material is a glass comprising praseodymium oxide ($Pr_2O_3$), magnesium oxide (MgO), phosphorous pentoxide ($P_2O_5$), and sodium monoxide ($Na_2O$). The glass was made from a melt of $Pr_2O_3$, MgO, $NH_4.H_2PO_4$, and $NaPO_3$. Another composition shown to work consists of:

| | | |
|---|---|---|
| 14.5% by weight $Pr_2O_3$ = | 5.0 mole % $Pr_2O_3$ = | 2.0 mole % Pr |
| 8.8% by weight MgO = | 25.0 mole % MgO = | 5.0 mole % Mg |
| 68.5% by weight $P_2O_5$ = | 55.0 mole % $P_2O_5$ = | 21.8 mole % P |
| 8.2% by weight $Na_2O$ = | 15.0 mole % $Na_2O$ = | 5.9 mole % Na and = 65.3 mole % O. |

This second preferred composition was made by the following similar procedure:

1) mixing the powders of the respective oxides and phosphates (the raw materials) to achieve the mole percentages listed above for 1-2 hours,
2) placing the mixed powders in a ceramic (alumina) crucible,
3) heating to 300° C. for 16 hours, to convert $NH_4.H_2PO_4$ to $P_2O_5$,
4) placing the heated mixture in a furnace preheated to 860° C.,
5) raising the temperature to 1220°-1250° C. at 300°-400° C./hour,
6) pouring the molten glass into an aluminum mold and letting it cool into a solid, 7) remelting the solidified glass at 1100° C. in a platinum crucible,
8) cooling the remelted glass at ambient room temperature,
9) annealing the solidified glass between 500°-540° C., and
10) repeating steps 7 to 10 to remove seeds and bubbles as necessary.

In step 6, the sample was cooled at ambient room temperature to form a solid. After solidification, the glass contained many seeds and bubbles which required elimination in the final product. Removal of the seeds and bubbles was accomplished by remelting and annealing the glass in a platinum crucible as outlined in steps 7 to 10. This remelting and annealing step was repeated two times. Remelting was done at 1100° C., repouring into an aluminum mold at 1030°-1040° C. and annealing between 500°-540° C. Following the second remelting and annealing, the glass was ready for fabrication to the precise dimensions needed to fit the optical device.

FIG. 1 shows the optical transmission between 190 to 500 nm of the glass sample made in example 1. The optical transmission plot was obtained as follows:

Collection of Optical Transmission Data for Sample of Example 1

The measurement of OT was made on a sample of example 1. This sample was rod shaped with a diameter of approximately 0.8 cm and length of approximately 1 cm. The OT was measured along the length of the sample. Prior to making the OT measurement, the sample was polished. The sample was polished to a surface figure (flatness) of 1/10 of a wavelength at 632.8 nm. After the sample was prepared according to the composition of example 1 and polished, the OT measurements were made from 190 to 500 nm. The measurements of OT were made on a Perkin-Elmer UV/VIS/NIR Lambda 9 spectrophotometer. The data of OT collected is plotted in FIG. 1 wherein the ordinate (y-axis) is the percent OT and the abscissa (x-axis) is the wavelength in nm.

The Verdet constant for the sample made in example 1 was approximately 3570 deg/Tesla-meter at 308 nm. The procedure for measuring the Verdet constant of the sample of example 1 is outlined below:

Experimental Measurement of the Verdet Constant

To measure the Verdet constant of the 5% Pr:NaMg(PO$_3$)$_3$ glass sample made in example 1, two light sources were used. The first was a Helium:Neon laser operating 632.8 nm and the second was a XeCl excimer laser operating at 308 nm. The light from each of these lasers was passed through a Glan-Thompson polarizer so that the transmitted light would be polarized along a known axis. This polarized light was then passed through the 5% Pr:NaMg(PO$_3$)$_3$ glass sample of example 1. The glass sample was exposed to a magnetic field which was aligned with the direction of light propagation. The light was then passed through a second analyzing Glan-Thompson polarizer which rotated the plane perpendicular to the laser light direction of motion. The final transmitted light was detected using a vacuum photodiode.

The magnetic field was generated using a single permanent Nd—Fe—B rare earth magnet obtained from Electro-Optics Technology, Fremont, Calif. This magnetic material had a residual magnetization of 11.7 kGauss, a cohercive force of 14.0 kGauss and a magnetic field energy of $35 \times 10^6$ Gauss-Oe. The magnetic material used was cuboid with dimensions of $4.5 \times 4.5 \times 4.5$ cm. A hole approximately 1.0 cm in diameter was centered on the North pole face of this cube and passed through to the center of the South pole face. The magnetic field strength along this hole was measured using a F. W. Bell Model 660 Digital Gaussmeter with a CAU6-2560 Axial Cryogenic Hall Probe. The maximum magnetic field strength along this hole was 4500 gauss. The glass sample made in example 1 was approximately 1.0 cm long and was placed in a region of the hole, centered at approximately 2.5 cm from the south pole face, where the magnetic field strength was $3850 \pm 50$ Gauss over the length of the sample.

The Faraday rotation measurement procedure was as follows:

Step 1: The Faraday rotating material was removed from the magnet which was situated between the two Glan-Thompson polarizers. Next, the two polarizers had their optical axis oriented perpendicular to each other, to minimize the amount of light being transmitted and detected by the vacuum photodiode. Step 2: The Faraday rotating material was inserted into the rare earth magnet such that the magnetic field direction was parallel to the laser light's direction of propagation. It was also necessary to place the Faraday rotating material in a section of the magnet where the magnetic field strength was known. Step 3: With the Faraday rotating material inserted into the magnetic field there was an increase in the signal detected by the photodiode while the Faraday rotating material had a non-zero Verdet constant. The angular amount of Faraday rotation generated was determined by adjusting the angle setting on the second, analyzing, Glan-Thompson polarizer.

The Verdet constant was determined directly from the equation $\theta = VBI$ where $\theta$ is the amount of Faraday rotation generated, V is the Verdet constant, B is the experimental magnetic field strength, and I is the length of the glass rotator sample along the optical axis. For the 5% Pr:NaMg(PO$_3$)$_3$ glass sample of example 1, the angular rotation measured using the above technique using the Helium:Neon laser at 632.8 nm and the XeCl excimer laser at 308 nm is 1 degree 42 minutes (0.0297 radians) and 13 degrees 56 minutes (0.24 radians), respectively. The sample of example 1 was approximately 1.0 cm long and was situated in a magnetic field of $3850 \pm 50$ Gauss (0.385 Tesla). Using the above equation, the Verdet constant was calculated at 632.8 nm and 308 nm to be 7.71 radians/Tesla-meter (441.8 deg/Tesla-meter) and 62.3 radians/Tesla-meter (3569.5 deg/Tesla-meter), respectively.

What is claimed is:

1. A Faraday rotator glass comprising:
   (a) at least one member selected from the group consisting of fluoride glass, and fluorophosphate glass, wherein said glass is doped with
   (b) at least one lanthanide constituent selected from the group consisting of Ce, Pr and Tm in a concentration sufficient to provide a Verdet constant of at least 2870 degree/Tesla-meter and optical transmission of at least 50 percent in a 25 mm thick polished glass sample at least at one wavelength in the 200 to 400 nm wavelength region;
   (c) at least one monovalent non-lanthanide cation selected from the group consisting of Na, Li and K in a concentration sufficient to provide a Verdet constant of at least 2870 degree/Tesla-meter and optical transmission of at least 50 percent in a 25 mm thick polished glass sample at least at one wavelength in the 200 to 400 nm wavelength region;

(d) at least one divalent or trivalent non-lanthanide cation selected from the group consisting of Mg, Be, Ca and Al in a concentration sufficient to provide a Verdet constant of at least 2870 degree/Tesla-meter and optical transmission of at least 50 percent in a 25 mm thick polished glass sample at least at one wavelength in the 200 to 400 nm wavelength region; and (e) 10 to 90 mole percent oxygen.

2. The Faraday rotator glass of claim 1 wherein the concentration of said divalent or trivalent non-lanthanide cations is sufficient to provide surface flatness of at least 1/10 of a wavelength at 632.8 nm.

3. The Faraday rotator glass of claim 1 wherein the concentration of said lanthanide constituent is from 0.0001 to 25 mole percent.

4. The Faraday rotator glass of claim 1 wherein the concentration of said lanthanide constituent is from 0.5 to 20 mole percent.

5. The Faraday rotator glass of claim 1 wherein the concentration of said lanthanide constituent is from 0.1 to 15 mole percent.

6. The Faraday rotator glass of claim 1 wherein the concentration of said lanthanide constituent is from 1.5 to 10 mole percent.

7. The Faraday rotator glass of claim 1 wherein the concentration of said monovalent non-lanthanide cations is from 0.01 to 50 mole percent; the concentration of said divalent or trivalent non-lanthanide cations is from 0.01 to 50 mole percent; and provided that the total non-lanthanide cation concentration is less than 65 mole percent.

8. The Faraday rotator glass of claim 1 wherein the concentration of said monovalent non-lanthanide cations is from 1 to 40 mole percent; the concentration of said divalent or trivalent non-lanthanide cations is from 1 to 40 mole percent; and provided that the total non-lanthanide cation concentration is less than 65 mole percent.

9. The Faraday rotator glass of claim 1 wherein the concentration of said monovalent non-lanthanide cations is from 2 to 30 mole percent and the concentration of said divalent or trivalent non-lanthanide cations is from 2 to 30 mole percent.

10. The Faraday rotator glass of claim 1 wherein the concentration of said monovalent non-lanthanide cations is from 3 to 25 mole percent and the concentration of said divalent or trivalent non-lanthanide cations is from 3 to 25 mole percent.

11. The Faraday rotator glass of claim 1 wherein the concentration of said lanthanide constituent is from 1.5 to 20 mole percent, wherein the concentration of said monovalent non-lanthanide cations is from 3 to 25 mole percent, wherein the concentration of said divalent or trivalent non-lanthanide cations is from 3 to 25 mole percent and wherein the concentration of oxygen is from 35 to 75 mole percent.

12. A Faraday rotator glass according to claim 1 wherein said member is fluorophosphate glass.

13. The Faraday rotator glass of claim 12 wherein the concentration of said lanthanide constituent is from 1.5 to 20 mole percent, wherein the concentration of said non-lanthanide monovalent cations is from 3 to 25 mole percent, wherein the concentration of said divalent or trivalent non-lanthanide cations is from 3 to 25 mole percent, and wherein the concentration of oxygen is from 35 to 75 mole percent.

14. A Faraday rotator glass consisting essentially of:

(a) phosphate glass, wherein said glass is doped with (b) at least one lanthanide constituent selected from the group consisting of Ce, Pr and Tm in a concentration sufficient to provide a Verdet constant of at least 2870 degree/Tesla-meter and optical transmission of at least 50 percent in a 25 mm thick polished glass sample at least at one wavelength in the 200 to 400 nm wavelength region;

(c) at least one monovalent non-lanthanide cation selected from the group consisting of Na, Li and K in a concentration sufficient to provide a Verdet constant of at least 2870 degree/Tesla-meter and optical transmission of at least 50 percent in a 25 mm thick polished glass sample at least at one wavelength in the 200 to 400 nm wavelength region;

(d) at least one divalent or trivalent non-lanthanide cation selected from the group consisting of Mg, Be, Ca and Al in a concentration sufficient to provide a Verdet constant of at least 2870 degree/Tesla-meter and optical transmission of at least 50 percent in a 25 mm thick polished glass sample at least at one wavelength in the 200 to 400 nm wavelength region; and (e) 10 to 90 mole percent O.

15. The Faraday rotator glass of claim 14 wherein the concentration of said lanthanide constituent is from 1.5 to 20 mole percent, wherein the concentration of said monovalent non-lanthanide cations is from 3 to 25 mole percent, wherein the concentration of said divalent or trivalent non-lanthanide cations is from 3 to 25 mole percent, wherein the concentration of oxygen is from 35 to 75 mole percent, and wherein provided that the total mole percentage does not exceed 100 mole percent.

16. A Faraday rotator glass according to claim 14 wherein the concentration of said lanthanide cation is about 2.0 mole percent Pr, the concentration of the alkali is about 5.9 mole percent Na, the concentration of the alkali earth metal is about 5.0 mole percent Mg, the concentration of phosphorous from said phosphate is about 21.8 mole percent P and the concentration of said oxygen is about 65.3 mole percent O.

17. A Faraday rotator glass comprising:

(a) a fluoride glass;

(b) at least one lanthanide constituent selected from the group consisting of Ce, Pr and Tm in a concentration sufficient to provide a Verdet constant of at least 2870 degree/Tesla-meter and optical transmission of at least 50 percent in a 25 mm thick polished glass sample at least at one wavelength in the 200 to 400 nm wavelength region;

(c) at least one monovalent non-lanthanide cation selected from the group consisting of Na, Li and K in a concentration sufficient to provide a Verdet constant of at least 2870 degree/Tesla-meter and optical transmission of at least 50 percent in a 25 mm thick polished glass sample at least at one wavelength in the 200 to 400 nm wavelength region;

(d) at least one divalent or trivalent non-lanthanide cation selected from the group consisting of Mg, Be, Ca and Al in a concentration sufficient to provide a Verdet constant of at least 2870 degree/Tesla-meter and optical transmission of at least 50 percent in a 25 mm thick polished glass sample at least at one wavelength in the 200 to 400 nm wavelength region; and (e) 10 to 90 mole percent oxygen.

18. The Faraday rotator glass of claim 17 wherein the concentration of said lanthanide constituent is from 1.5 to 20 mole percent, wherein the concentration of said monovalent non-lanthanide cations is from 3 to 25 mole percent, wherein the concentration of said divalent or trivalent non-lanthanide cations is from 3 to 25 mole percent, and wherein the concentration of oxygen is from 35 to 75 mole percent.

19. The Faraday rotator glass of claim 18 wherein the concentration of said lanthanide constituent is from 1.5 to 15 mole percent.

* * * * *